April 1, 1969 B. A. ROGERS 3,436,683

SIGNAL PROCESSING CIRCUIT

Filed Oct. 22, 1965

DEMODULATOR

MODULATOR

INVENTOR.
BILL A. ROGERS
BY Robert C. Smith

United States Patent Office 3,436,683
Patented Apr. 1, 1969

3,436,683

SIGNAL PROCESSING CIRCUIT

Bill A. Rogers, Sepulveda, Calif., assignor to The Bendix Corporation, a corporation of Delaware Filed Oct. 22, 1965, Ser. No. 500,701
Int. Cl. H03c 1/54
U.S. Cl. 332—47 6 Claims

ABSTRACT OF THE DISCLOSURE

A diode-resistance bridge circuit is shown across which is connected either a direct current signal to be modulated or an alternating current signal to be demodulated. A pair of oppositely poled Zener diodes is connected in series across the opposite terminals of the bridge, and also connected across these same terminals is an alternating current reference voltage. This reference voltage is clipped by the Zener diodes such that it appears across the bridge as a square wave which causes the diodes of the bridge to conduct on alternate half cycles. When operating as a modulator, this action grounds the direct current input in synchronism with alternate half cycles of the reference voltage, thus acting like a "chopper." Operating as a demodultaor, it performs a phase comparison between the reference voltage and the alternating current input signals.

This invention relates to signal modulating and demodulating systems and more specifically to a diode bridge circuit which is capable of operation either as a modulator or demodulator.

Mechanical choppers have been used as modulating devices for a long time, but such choppers lack the reliability needed for many applications. The advent of transistor bridge modulators improved the reliability, but the cost of such modulators is substantial. Also, where a single modulating transformer could provide a reference alternating current to drive a number of choppers in synchronism, separate reference circuits are normally required for each transistor modulator. Semiconductor diodes have been connected in a bridge arrangement to provide a modulator circuit which is quite satisfactory in operation, but the diodes normally must be matched very carefully to insure that all branches of the bridge operate uniformly, and this selection requirement increases the cost of the usual diode bridge modulator considerably. It has been found that where closely matched resistors are placed in series with the diodes in each of the arms, the forward resistance of all branches or arms is considerably increased, but the diode variations become a far smaller percentage of the whole forward resistance. Thus, a satisfactory balance may be maintained with diodes having only normal tolerances. The resistors used should be quite uniform, but the cost of resistors having values within one percent of their nominal value is small compared with the cost of supplying matched diodes. It is, therefore, an object of the present invention to provide a semiconductor diode bridge circuit usable as either a modulator or demodulator, which has the high reliability normally associated with semiconductor modulator devices but which can be fabricated at substantially lower cost.

It is another object of the present invention to provide a semiconductor diode bridge circuit which can be conveniently used either as a modulator or as a demodulator without substantial changes.

It is a further object of the present invention to provide a semiconductor diode bridge circuit which requires only a simple alternating current reference or drive signal such that a number of modulators or demodulators may be driven in synchronism from a single alternating current source.

Other objects and advantages will become apparent from consideration of the following specification and the accompanying drawings in which.

Figure 1:
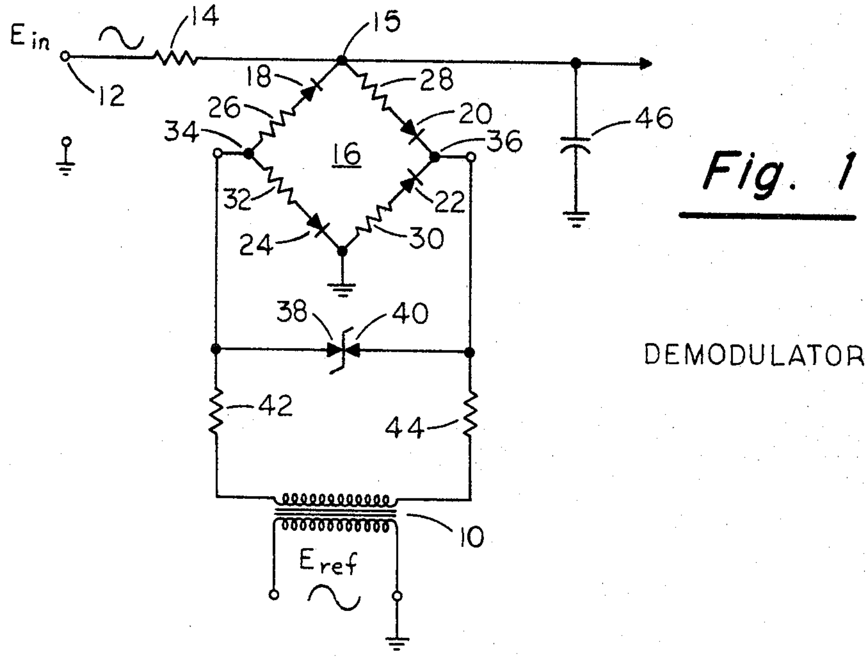
FIGURE 1 is a schematic diagram of a circuit including my invention which is connected to operate as a demodulator.

Referring now to FIGURE 1, it will be observed that there are two alternating current inputs to the device of FIGURE 1. The first is a reference alternating current signal supplied to the primary terminals of the modulating transformer 10, and the second is an input signal of the same frequency supplied at input terminal 12. The input signal supplied to terminal 12 is connected through a resistor 14 to a junction 15 of a semiconductor bridge circuit 16 which includes four branches containing diodes 18, 20, 22 and 24; and in series with each of said diodes resistors 26, 28, 30 and 32, respectively.

Connected to the opposite terminals 34 and 36 of the bridge 16 are a pair of oppositely poled Zener diodes 38 and 40. Also effectively connected to junction points 34 and 36 are a pair of resistors 42 and 44 which are connected at their opposite ends to the secondary winding of the reference transformer 10. Connected in the output of the demodulator circuit is a bypass capacitor 46 which provides the function of bypassing any undesired alternating current component to ground.

The device of FIGURE 1 receives an alternating current which may be considered to be essentially sinusoidal, and the desired output is a direct current signal proportional in amplitude to the input of the alternating current signal and having a polarity which is a function of the phase of the input as compared with the reference voltage. The input voltage will normally be either in phase or 180° out of phase with the voltage supplied from transformer 10. The reference voltage from the secondary of transformer 10 would normally be a sinusoidal voltage, but because of the clipping action of the Zener diodes 38 and 40 the reference voltage effectively appears across the bridge at junctions 34 and 36 as a square wave. This square wave will cause the diodes of the bridge to conduct on alternate half cycles of the reference voltage. During the time the diodes are conducting, the junction 15 is essentially at ground potential. Thus, each alternate half cycle of the input signal is grounded, and the output is a direct current voltage. Depending upon the phase relationship between the input voltage and the reference voltage, this output will be positive or negative. If the input reverses phase, the output will also reverse. In this manner it will be observed that the circuit of FIGURE 1 operates as a very effective and simple demodulator.

Figure 2:
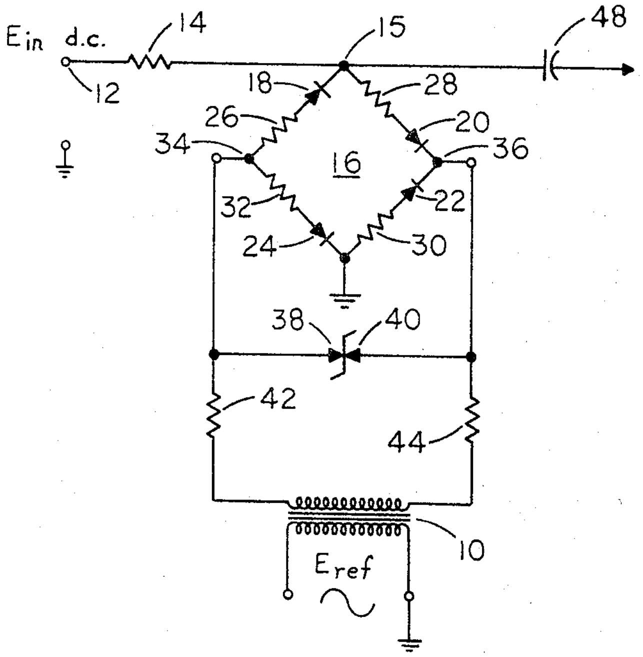
FIGURE 2 is a schematic diagram of a circuit including my invention which is connected to operate as a modulator.

The circuit shown in the schematic diagram of FIGURE 2 is connected as a modulator. The basic elements are essentially the same as those of FIGURE 1 and are numbered the same. The operation as a modulator is, of course, somewhat different from that as a demodulator. The reference signal in each case is an alternating signal supplied to the primary winding of transformer 10. Its output is an alternating current signal which is clipped through the action of diodes 38 and 40 such that its appears across junction points 34 and 36 as essentially a square wave signal. As in the case of the demodulator, the square wave causes the diodes of the bridge to conduct on alternate half cycles of the reference voltage, thereby causing the junction 15 to be effectively grounded on alternate half cycles. The input signal applied to terminal 12 is a direct current voltage of either polarity, and this voltage is effectively shorted to ground during alternate half cycles of the reference voltage, thereby producing a square wave, the phase of which is either in or out of phase with respect to the reference voltage depending upon the polarity of the input direct current signal. The series capacitor 48 is added to block direct current from reaching the following circuit.

While only a single basic embodiment of my invention is shown and described herein, it is recognized that modifications may be made by those skilled in the art, and I do not desire to be limited otherwise than in accordance with the following claims.

I claim:

1. Electrical apparatus for modifying an input signal comprising a four-arm semiconductor diode bridge having first and second pairs of opposed junctions, the diodes being arranged for conduction in two parallel paths between said first pair of junctions;
- a resistor in series with the diode in each of said arms;
- a pair of oppositely poled Zener diodes connected in series across said bridge between said first pair of junctions;
- resistance means connected to each of said first pair of junctions;
- an alternating current source connected to each of said resistance means;
- and means for applying said input signal across said second pair of opposed junctions.

2. Electrical apparatus for modifying an input signal comprising a four-arm diode bridge having first and second pairs of opposed junctions, the diodes being arranged for conduction in two parallel paths between said first pair of junctions;
- a resistor in series with the diode in each of said arms;
- a pair of oppositely poled Zener diodes connected in series across said bridge between said first pair of junctions;
- a resistor connected to each of said first pair of junctions;
- a transformer having its primary winding connected to an alternating current source and having each end of its secondary winding connected to one of said resistors;
- and means for applying said input signal across said second pair of opposed junctions.

3. A modulator for modulating an input signal and a modulating signal comprising a four-arm semiconductor diode bridge having first and second pairs of opposed junctions, the diodes being arranged for conduction in two parallel paths between said first pair of junctions;
- a resistor in series with the diode in each of said arms;
- a pair of oppositely poled Zener diodes connected in series across said bridge between said first pair of junctions;
- a resistor connected to each of said first pair of junctions;
- a transformer having its primary winding connected to a source of modulating current and having each end of its secondary winding connected to one of said resistors;
- and means applying said input signal across said second pair of opposed junctions.

4. A modulator as set forth in claim 3 wherein a series resistor is connected between said input signal source and said bridge and a series-connected capacitor is provided in the output of said bridge as a direct current blocking means.

5. A demodulator for converting an alternating input signal to a direct current signal comprising a four-arm semiconductor diode bridge having first and second pairs of opposed junctions, the diode being arranged for conduction in two parallel paths between said first pair of junctions;
- a resistor in series with the diode in each of said arms;
- a pair of oppositely poled Zener diodes connected in series across said bridge between said first pair of junctions;
- a resistor connected to each of said first pair of junctions;
- a transformer having its primary winding connected to an alternating current source and having each end of its secondary winding connected to one of said resistors;
- a transformer having its primary winding connected to an alternating current source and having each end of its secondary winding connected to one of said resistors;
- and means applying said input signal across said second pair of opposed junctions.

6. A demodulator as set forth in claim 5 wherein a series resistor is connected between the input signal source and said bridge and bypass capacitance means is provided in the output of said bridge to bypass alternating current.

References Cited

UNITED STATES PATENTS

| | | | |
|---|---|---|---|
| 2,887,591 | 5/1959 | Young | 307—88.5 |
| 3,091,704 | 5/1963 | Bashor et al. | 307—88.5 |
| 3,201,641 | 8/1965 | Thorne | 307—88.5 X |
| 3,243,664 | 3/1966 | Louis | 307—88.5 X |

ROY LAKE, *Primary Examiner.*

LAWRENCE J. DAHL, *Assistant Examiner.*

U.S. Cl. X.R.

307—318, 321; 329—204